United States Patent
Ahn

(10) Patent No.: US 6,901,254 B2
(45) Date of Patent: May 31, 2005

(54) METHOD OF SELECTING BASE TRANSCEIVER SYSTEM IN COMMUNICATION SYSTEM

(75) Inventor: Heejune Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 430 days.

(21) Appl. No.: 09/925,008

(22) Filed: Aug. 9, 2001

(65) Prior Publication Data

US 2002/0022487 A1 Feb. 21, 2002

(30) Foreign Application Priority Data

Aug. 10, 2000 (KR) ........................................ 2000-46333

(51) Int. Cl.[7] ............................ H04Q 7/20; H04B 7/00; H04B 1/38; H04M 1/00; G01R 31/08
(52) U.S. Cl. .................... 455/422.1; 455/436; 455/442; 455/450; 455/451; 455/452.1; 455/452.2; 455/528; 370/252; 370/331; 370/332; 370/347
(58) Field of Search ............................. 455/455, 422.1, 455/458, 456.1, 456.6, 561–562, 445, 446, 449, 450, 442, 451, 452.1, 560, 452.2, 524, 525; 370/465, 468, 241–242, 248, 310, 328–329, 331–335, 208

(56) References Cited

U.S. PATENT DOCUMENTS

| | | | | |
|---|---|---|---|---|
| 5,790,534 A | * | 8/1998 | Kokko et al. ............. | 455/452.1 |
| 5,799,254 A | * | 8/1998 | Karmi et al. ................ | 455/528 |
| 5,884,187 A | * | 3/1999 | Ziv et al. ..................... | 455/442 |
| 6,038,458 A | * | 3/2000 | Siira .......................... | 455/560 |
| 6,088,335 A | * | 7/2000 | I et al. ........................ | 370/252 |
| 6,205,129 B1 | * | 3/2001 | Esteves et al. ............... | 455/451 |
| 6,216,004 B1 | * | 4/2001 | Tiedemann et al. ......... | 455/442 |
| 6,327,472 B1 | * | 12/2001 | Westroos et al. ........... | 455/450 |
| 6,363,252 B1 | * | 3/2002 | Hamalainen et al. ........ | 455/436 |
| 6,393,276 B1 | * | 5/2002 | Vanghi ..................... | 455/422.1 |
| 6,542,736 B1 | * | 4/2003 | Parkvall et al. ............. | 455/422 |
| 6,542,742 B2 | * | 4/2003 | Schramm et al. ........... | 455/436 |
| 6,564,060 B1 | * | 5/2003 | Hoagland .................... | 455/450 |
| 6,574,211 B2 | * | 6/2003 | Padovani et al. ........... | 370/347 |
| 6,580,700 B1 | * | 6/2003 | Pinard et al. ................ | 370/332 |
| 6,621,809 B1 | * | 9/2003 | Lee et al. .................... | 455/450 |
| 6,680,926 B2 | * | 1/2004 | Bender et al. ............... | 370/331 |

OTHER PUBLICATIONS

Holtzman, Jack M.; "CDMA Forward Link Waterfilling Power Control," 2000 IEEE VTC 2000, 3/00; pp. 1663–1667.

Sanjiv Nanda et al.; "Adaptation Techniques in Wireless Packet Data Services;" IEEE Communications Magazine, Jan. 2000; pp. 54–64.

Toyoki Ue et al., "Symbol Rate and Modulation Level–Controlled Adaptive Modulation/TDMA/TDD System for High–Bit–Rate Wireless Data Transmission," IEEE Transactions on Vehicular Technology, vol. 47, No. 4, Nov. 1998; pp. 1134–1147.

* cited by examiner

Primary Examiner—William D. Cumming
(74) Attorney, Agent, or Firm—Fleshner & Kim, LLP

(57) ABSTRACT

A method of selecting a base transceiver system (or sector) in an area where signals from various base transceiver systems (or sectors) are superimposed. In order to be suitable for a system that aims at the packet transmission such as the high data rate (HDR) communication system, the load information of the base transceiver system (or sector) is transmitted to the mobile station. The mobile station selects the optimum base transceiver system (or sector) according to the load information, and requests the down-link data transmission to the base transceiver system at the desired data transmission rate.

28 Claims, 2 Drawing Sheets

SC: synchronous control channel
CC: continuation control channel
AC: asynchronous control channel

METHOD OF SELECTING BASE TRANSCEIVER SYSTEM IN COMMUNICATION SYSTEM

BACKGROUND OF THE INVENTION

1. Field of the Invention

The present invention relates generally to a mobile communication system, and more particularly to a method of selecting a base transceiver system in a communication system that is for a mobile station to request a forward data transmission.

2. Background of the Related Art

As is well known, a mobile communication system based on a code division multiple access (CDMA) divides a space into cells and sectors. Each mobile station registers a sector where it receives a signal having the best receiving strength among received signals to perform signal transmission and reception.

Up to the present, the mobile radio communication has been designed for the purpose of providing real-time voice services such as IS-95. Accordingly, the mobile communication system for providing the real-time voice services has been designed to make each mobile station observe the minimum transmission quality, i.e., signal strength, over a threshold value in a cell area.

To cope with neighboring areas between two cells where the signal from a base station of a cell become weak, a soft handover technique using a macro diversity has been proposed and used.

Meanwhile, with the recent increase of data service requests through the Internet, the standard such as HDR (high data rate, Qualcomm), 1xTREME (Motorola, Nokia), etc., has been proposed.

According to the standard proposed in the system, the mobile station detects signal of sectors which are determined to be active sets, and reports a useable transmission rate to the sector having the most superior channel environment. The respective sector schedules packets to be transmitted to the respective mobile station accordingly, and transmits the packets using an adaptive modulation technique through a down channel. This can achieve the performance improvement in the voice communication since respective selected diversities are used instead of performing the soft handover using all radio resources of the two cells.

The above-described HDR system has been proposed to provide only a high-speed radio packet data service.

This system implements the high-speed radio Internet technique based on the Internet protocol, and especially can easily implement a radio Internet environment by connecting HDR equipment to the existing CDMA network. Also, it supports both voice and data in the same network by separately optimizing voice and data spectrums.

Especially, in transmitting data to an up link (i.e., from the mobile station to the base transceiver system), the HDR system basically has the same structure as IS-95, IS-2000, and WCDMA systems, and in transmitting data to a down link (i.e., from the base transceiver system to the mobile station), it commonly accesses the radio resources (i.e., common channels) according to an asynchronous TDM method.

Accordingly, in the down-link access, the respective mobile station periodically reports the channel state to the base transceiver system through the best signal of one among the active sets, and the base transceiver system schedules the time point and sector where the data is transmitted, and selects an encoder that supports the transmission rate required by the mobile station to transmit the data to the mobile station.

For example, as shown in FIG. 1, in the mobile communication system including at least one base transceiver system (BTS) whose regions BTSA, BTSB, and BTSC are divided into several sectors A1~A3, B1~B3, and C1~C3, respectively, and a base station controller (BSC) for managing the base transceiver system (BTS), a certain mobile station located in a superimposing region of the sectors A2 and B1 (which is subject to handover) forms one active set that receives a pilot signal from the sectors A2 and B1.

Here, the mobile station calculates the channel state of the respective base transceiver systems (or sectors) using the pilot signals from the respective base transceiver systems (or sectors) in the active set or signals that provide the same function, calculates the transmission rate suitable for a bit error rate or packet error rate based on the channel state, and requests the data transmission to the corresponding base transceiver system (or sector) that can transmit at the highest transmission rate.

Accordingly, the mobile station requests the forward data transmission to the sector having a better channel environment than the other sector between the sectors A2 and B1.

This forward data transmission request of the mobile station to the base transceiver system (or sector) is performed using a data rate control (DRC) media access control channel of the up link, and the request for the transmission rate is reported through the transmission of the request to the base transceiver system (or sector) covering a Walsh.

This DRC transmission is performed during a DRCLength slot defined by a system parameter, and the base transceiver system (or sector) discriminates the respective mobile stations using the covered Walsh code.

As described above, according to the conventional system, the data transmission is requested to the base transceiver system (or sector) at the data transmission rate in proportion to the channel environment of the base transceiver system (or sector).

In the general mobile radio communication system as described above, the number of mobile stations which have the respective base transceiver systems (or sectors) as their active sets is variable, and is generally independent of the channel state.

Also, according to the conventional system, the respective mobile station does not have information on the number of mobile stations in the base transceiver system (or sector) and the load extent, and thus the respective mobile station requests the forward data transmission to the base transceiver system (or sector) having the best channel environment irrespective of the load extent of the base transceiver system (or sector).

As a result, even though the corresponding base transceiver system to which the respective mobile station requests the data transmission has a good channel environment, the amount of data actually transmitted to the mobile station is reduced if all the mobile stations managed by the base station have excessive loads.

SUMMARY OF THE INVENTION

Accordingly, the present invention is directed to a method of selecting a base transceiver system in a communication system that substantially obviates one or more problems due to limitations and disadvantages of the related art.

An object of the present invention is to provide a method of selecting a base transceiver system in a communication system that can consider the load of the base transceiver system when a forward data transmission is requested.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve this object and other advantages and in accordance with the purpose of the invention, as embodied and broadly described herein, a method of selecting a base transceiver system in a communication system includes the steps of at least one base transceiver system providing to a mobile station load information that is a receiving probability of a signal; the mobile station deciding a forward data transmission rate according to a channel state of the signal received from the base transceiver system; the mobile station selecting a certain base transceiver system with which the mobile station will communicate using the provided load information and the decided forward data transmission rate; and the mobile station requesting the forward data transmission to the selected base transceiver system.

At the step of providing the load information, the receiving probability is in reverse proportion to the number of mobile stations which the base transceiver system includes as its active set, and is determined from a value obtained by dividing a length of a slot that received data by a length of a slot that requests the data to the specified base transceiver system. Also, the receiving probability becomes different according to a kind of service and priority of the data received from the base transceiver system.

The load information is transmitted to the corresponding mobile station using a synchronous control channel, asynchronous control channel, or dedicated channel.

Preferably, the selection step of the base transceiver system includes the steps of multiplying the load information provided for each base transceiver system by the forward data transmission rate determined for each base transceiver system; comparing values calculated for the respective base transceiver system with one another; and selecting the base transceiver system having the largest value according to a result of comparison.

The respective base transceiver systems belong to the active sets activated in the mobile station.

At the requesting step, the mobile station requests the forward data transmission to the base transceiver system through a data rate control (DRC) channel of a reverse link.

The data transmission rate information of an up link to be transmitted from the base transceiver system and the information on the base transceiver system selected by the mobile station are inserted into and transmitted through the DRC channel.

Preferably, after the requesting step, the method of selecting a base transceiver system further comprises the steps of the base transceiver system receiving the DRC channel transmitted from the mobile station; the base transceiver system checking the mobile station that completes the DRC channel transmission until "(present slot time)-1-(present slot time mod (i.e., DRC channel length))"; the base transceiver system determining the data transmission scheduling for one among the checked mobile stations according to the received DRC channel information; and performing the data transmission according to the data transmission rate requested by the corresponding mobile station according to the scheduling.

In another aspect of the present invention, a method of selecting a base transceiver system in a communication system includes the steps of receiving probability information and channel state information through a forward link; estimating a forward data transmission rate corresponding to the channel state information; selecting a corresponding base transceiver system in which the estimated forward data transmission rate and a value proportioned to the receiving probability in an active set become maximum; and requesting a forward data transmission to the selected base transceiver system.

The receiving probability information is transmitted to corresponding mobile stations in case that the corresponding base transceiver system is included in an active set of a new mobile station.

Also, the receiving probability information is transmitted to corresponding mobile stations in case that the active set is changed over a threshold value.

Also, the receiving probability information is periodically transmitted to corresponding mobile stations according to a timer, or non-periodically transmitted according to a request of the corresponding mobile station.

The mobile station is a mobile station that can perform data transmission/reception with at least two base transceiver systems.

Preferably, the method of selecting a base transceiver system further comprises the steps of calculating a bit error rate or packet error rate from the channel state information; and determining the data transmission rate according to the calculated bit error rate or packet error rate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
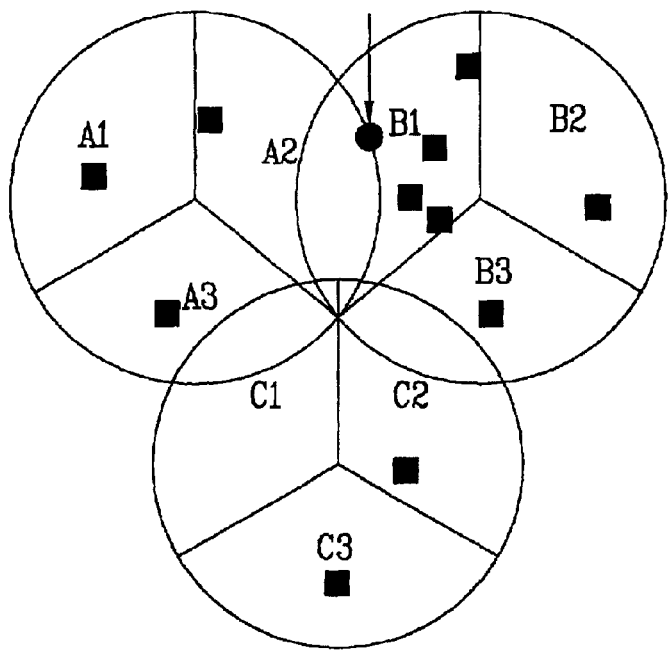
FIG. 1 is a view illustrating the distribution of active sets formed centering around a mobile station in a general HDR system.

Reference will now be made in detail to the preferred embodiments of the present invention, examples of which are illustrated in the accompanying drawings.

The present invention proposes an algorithm that receives a load extent (i.e., receiving probability) of a base transceiver system (or sector) from the corresponding base transceiver system, selects an optimum base transceiver system (or sector) considering the load extent (i.e., receiving probability) and a forward traffic channel environment of the base transceiver system (or sector), and requests a data transmission to the optimum base transceiver system (or sector) at a desired data transmission rate.

Specifically, the present invention is directed to the selection of a base transceiver system (or sector) in an area where signals from various base transceiver systems (or sectors) are superimposed. According to the present invention, in order to be suitable for a system that aims at the packet transmission such as the high data rate (HDR) communication system, the load information of the base transceiver system (or sector) is transmitted to the mobile station, and the mobile station selects the optimum base transceiver system (or sector) according to the load information, and requests the forward data transmission to the base transceiver system (or sector) at the desired data transmission rate.

This is because since the number of actual users is variable among the cells in the mobile communication system and the data traffic has a strong burst property, the traffic loads among the respective cells differ greatly.

Accordingly, in order to detect the forward data transmission request from the respective mobile stations, the base transceiver system (or sector) considers as an effective mobile station for the data transmission the mobile station that receives the transmission rate $C_1(t)$ according to the DRC transmission from the respective mobile stations in the active set, and completes the DRC transmission before "t-1-(t mod DRCLength)" at the present slot time t.

Then, the base transceiver system performs a transmission scheduling for deciding to which mobile station among the effective mobile stations it transmits the signal using a proper algorithm.

Generally, the algorithm used in the base transceiver system (or sector) makes the respective mobile station satisfy the minimum uniformity and have the maximum throughput of data from the base transceiver system.

According to the present invention, the following terms are assumed.

Generally, in case of the HDR system, the mobile station can obtain the load information of the cell from the corresponding base transceiver system (or sector) even if one among the following conditions is satisfied.

First is the case that all the base transceiver systems (or sectors) corresponding to the respective active sets transmit independent information through respective (synchronous) control channels, and the mobile station decodes the information simultaneously.

For reference, since the existing IS-95 or HDR mobile station uses the active set, it can receive the signal transmitted from at least two base transceiver systems (or sectors) of the same frequency band.

Second is the case that one base station controller (BSC) or base transceiver system (BTS) transmits independent information through respective (synchronous) control channels, and the mobile station obtains one among the independent information.

At this time, the information transmitted from the respective base transceiver systems (or sectors) or one base transceiver system (BTS) is a plurality of "PN offset that is an identifier of base transceiver system (or sector)+receiving probability ($p_k$)."

Third is the case that if it is impossible to transmit the information to the control channel, the respective mobile station requests the information through a traffic channel, and receives the information corresponding to the active set.

Fourth is the case that if the common channel of the HDR system is used, the mobile station is in an active state, and thus all the synchronous or asynchronous control channels are used.

Specifically, in order for the mobile station according to the present invention to obtain the load information from the corresponding base transceiver (or sector) in the active set, it should be in the above-described state. Especially, the receiving probability $p_k$ that is included in the load information and periodically or non-periodically transmitted from the respective base transceiver system (or sector) to the mobile station through the common control channel or dedicated common channel should satisfy the following conditions.

First is the case that the base transceiver system is included in the active set of a new mobile station.

Second is the case that the size of the active set (i.e., the number of elements) that can be included in the mobile station is changed over the threshold value.

Third is the case that if the receiving probability is periodically transmitted to the mobile station, its periodic timer is expired.

Fourth is the case that there exists a special request for additional information by the mobile station.

In the above-described cases, according to the present invention, the load information (i.e., receiving probability) of the base transceiver system is transmitted to the mobile station, and the mobile station requests the forward data transmission to the optimum base transceiver system (or sector) in consideration of the load information (i.e., receiving probability) and the traffic channel environment of the base transceiver system.

Figure 2:
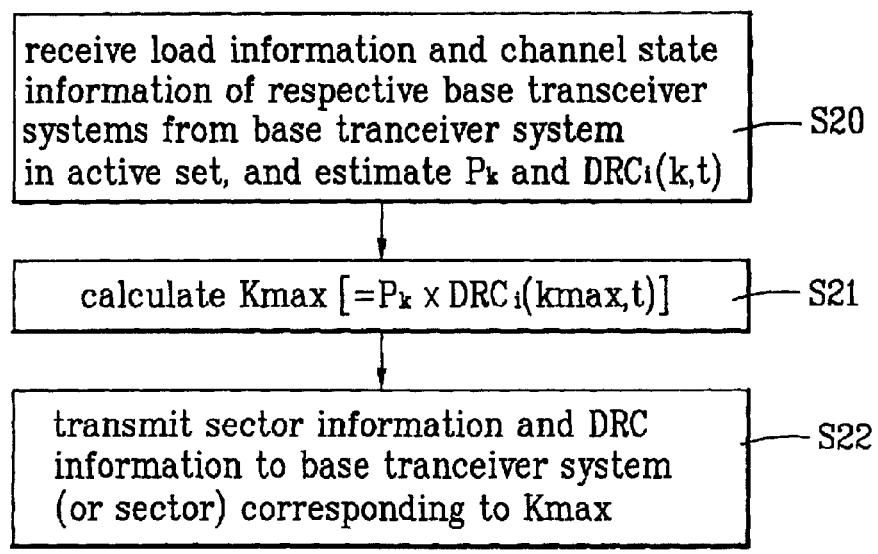
FIG. 2 is a flowchart illustrating the method of selecting a base transceiver system (or sector) for requesting a forward data transmission according to an embodiment of the present invention.

FIG. 2 is a flowchart illustrating the method of selecting a base transceiver system (or sector) for requesting a forward data transmission according to the present invention.

Generally, in the reverse link of the HDR system, data is transmitted through a Q channel, and the data rate control (DRC) channel, reverse rate indicator (RRI) channel, and pilot channel are transmitted through I channel in the form of a time-division-multiplexing slot structure.

The DRC channel is used for informing to the base transceiver system the data transmission rate of a forward link and information on a sector that is to transmit the data according to the data transmission rate, which are two kinds of information required by the mobile station.

The mobile station, prior to transmission of the DRC information, performs a calculation for the DRC transmission from the present time t, and at this time, the estimated value for the DRC transmission is defined as $DCR_f(k,t)$.

The $DCR_f(k,t)$ is a value that represents the forward data transmission rate to be transmitted to the base transceiver system (or sector) in the active set by the mobile station. The mobile station receives the channel state information of the respective base transceiver systems (or sectors) through the respective pilot signals or signals that provide the same function as the pilot signals from the respective base transceiver systems (or sectors) in the active set, and the transmission rate suitable for the bit error rate or packet error rate is calculated based on the channel environment. That is, it is the value representing the function according to the channel environment of the previous slot based on the present time t.

Here, I indicates an identifier index of the mobile station, and the $DRC_i(k,t)$ is used as a value for deciding the DRC transmission request with respect to the identifier index k of the corresponding base transceiver system (or sector) at the present time t.

The mobile station performs a calculation for the DRC transmission using the load information of the base transceiver system (or sector) transmitted from the base transceiver system in addition to the value of $DRC_i(k,t)$ according to the channel environment (step S20).

According to the present invention, the receiving probability $p_k$ is used as a load information parameter.

In addition, however, other parameters such as a probability value or estimated value according to the load may be used as the parameter representing the load information.

Specifically, a certain mobile station i requests the data transmission with the value of the forward data transmission rate $DCR_i(kmax,t)$ to the base transceiver system (or sector) corresponding to the index kmax wherein the multiplication of the value of the calculated $DCR_i(k,t)$ value and the value of the receiving probability $p_k$ becomes maximum.

The receiving probability $p_k$ is $1/M_k$ in case that the base transceiver system k defines the number of mobile stations included in the active set as $M_k$.

Accordingly, the mobile station performs the DRC transmission that includes the information on the data transmission rate of the forward link and the sector which will transmit the data according to the transmission rate to one among the base transceiver systems (or sectors a, b, and c) in the active set through the DRC channel during the DRCLength having n time slots (step S22).

At this time, the mobile station uses the sme DRC during one DRCLength.

The corresponding base transceiver system (or sector), that received the data transmission rate $DRC_i(kmax,t)$, acknowledges the mobile stations which completed the DRC transmission prior to the "t-1-(t mod DRCLength)" at the present slot time t as the effective mobile stations for the data transmission in order to detect the forward data transmission requests from the respective mobile stations.

The "t mod DRCLength" represents the remainder obtained by dividing t by DRCLength.

Then, the base transceiver system (or sector) performs the transmission scheduling using a proper algorithm for deciding which mobile station among the effective mobile stations it transmits the signal to.

If it is assumed that the mobile station performs the DRC transmission at the n-th time slot according to the transmission scheduling, the corresponding base transceiver system (or sector) performs the data transmission using the forward data transmission rate at the (n+2)-th slot.

At this time, the data transmitted from the base transceiver system (or sector) is transmitted, covering the Walsh code given to the user who transmitted the DRC value at the n-th slot, so that the base transceiver system can discriminate the users (i.e., mobile terminals).

Figure 3:
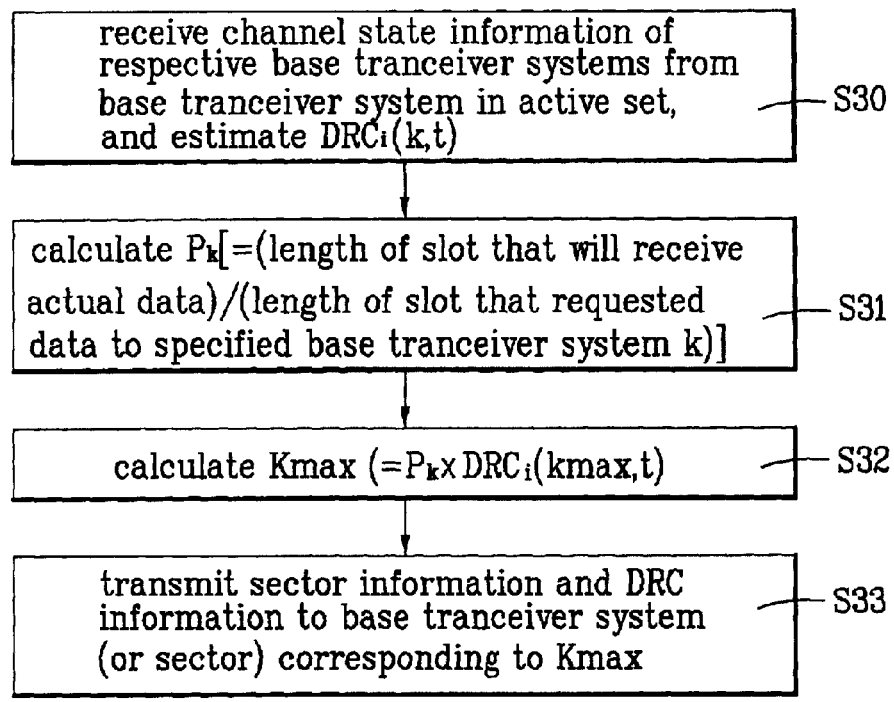
FIG. 3 is a flowchart illustrating the method of selecting a base transceiver system (or sector) for requesting a forward data transmission according to another embodiment of the present invention.

FIG. 3 is a flowchart illustrating the method of selecting a base transceiver system (or sector) for requesting a forward data transmission according to another embodiment of the present invention.

If the base transceiver system (or sector) has not yet sent the information including the receiving probability to the mobile station or the mobile station has not yet received the first information, the mobile station calculates the receiving probability $p_k$ based on the result up to now.

That is, the receiving probability $p_k$ is actually calculated by "(length of a slot that received the actual data)/(length of a slot that requested the data to a specified base transceiver system (or sector) k).

Accordingly, in the same manner as described above, the mobile station receives the channel state information of the respective base transceiver systems (or sectors) through the respective pilot signals or signals that provide the same function as the pilot signals from the respective base transceiver systems (or sectors) in the active set, and estimates the $DCR_i(k, t)$ suitable for the bit error rate or packet error rate based on the channel environment (step S30).

The mobile station determines the index kmax wherein the multiplication of the calculated value of $p_k$ and the value of $DCR_i(k,t)$ becomes maximum as the cell (or sector) to which the data transmission is requested (step S31), and transmits the DRC information to the base transceiver system (or sector) corresponding to the index kmax (step S33).

Figure 4:
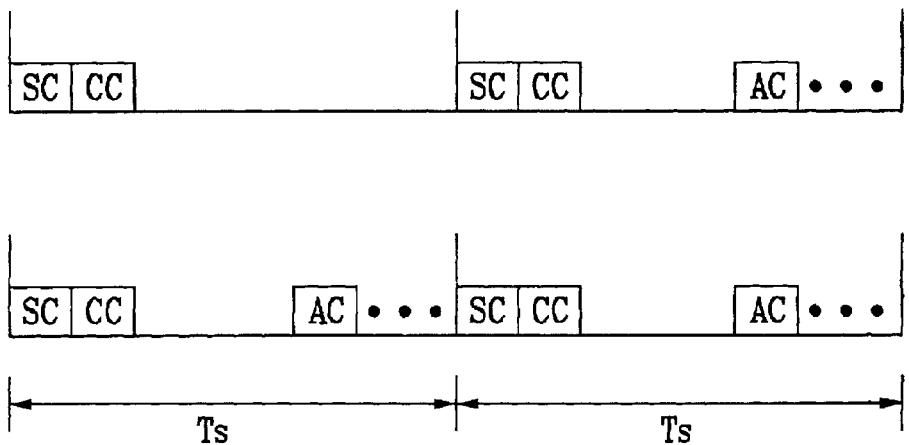
FIG. 4 is a view illustrating the construction of a down-control channel of an HDR system incorporating the present invention.

Meanwhile, FIG. 4 is a view illustrating the construction of a down-link control channel of an HDR system. Referring to FIG. 4, both a synchronous control channel capsule and a continuation control channel capsule (optional) are transmitted together, and an asynchronous control channel capsule is transmitted just after the synchronous control channel capsule if a synchronous control channel field in an OverheadSignature message transmitted through the synchronous control channel is not set to 1.

The transmission of the synchronous control channel is performed for each $T_s$.

The respective base transceiver system (or sector) transmits the same or different information to the synchronous control channel for a determined period. At this time, the respective base transceiver system (or sector) can also transmit to the mobile station the receiving probability $p_k$ that is the load information on the corresponding base transceiver system (or sector) through the synchronous control channel, asynchronous control channel, or dedicated channel.

Especially, in case that the services are supported in distinction from the base transceiver system to the mobile station, the base transceiver system effects the forward data transmission according to the priority and kind of the service by dividing the services into predetermined grades and transmitting different receiving probabilities for the respective services.

However, even if the receiving probability applied to the mobile station is transmitted twice or more to the same mobile station, the receiving probability differs according to the service to be provided from the base transceiver system to the mobile station.

As described above, according to the present invention, since the mobile station actively takes part in the sector selection, the load among the respective base transceiver systems (or sectors) is reduced, and the whole transfer traffic is maximized or improved.

Also, the present invention can be applied to the system that can basically receive the data simultaneously from various base transceiver systems (or sectors), and the mobile station selects the optimum base transceiver system (or sector) considering the channel state and load from the respective base transceiver systems (or sectors) Since 1xTREME, which is under consideration in standardizing the next-generation mobile communication (3GPP2) of the synchronous type, has the same structure, it is possible to apply the present invention to it.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of selecting a base transceiver system in a communication system comprising:

at least one base transceiver system providing to a mobile station load information that is a receiving probability of a signal;

the mobile station deciding a forward data transmission rate according to a channel state of the signal received from the base transceiver system;

the mobile station selecting a certain base transceiver system with which the mobile station will communicate using the provided load information and the decided forward data transmission rate; and the mobile station requesting the forward data transmission to the selected base transceiver system, wherein the mobile station requests the forward data transmission through a data rate control (DRC) channel of a reverse link.

2. The method as claimed in claim 1, wherein the receiving probability is in reverse proportion to the number of mobile stations which the base transceiver system includes as its active set.

3. The method as claimed in claim 1, wherein the receiving probability is determined from a value obtained by dividing a length of a slot that received data by a length of a slot that requests the data to the specified base transceiver system.

4. The method as claimed in claim 1, wherein the receiving probability becomes different according to a kind of service and priority of the data received from the base transceiver system.

5. The method as claimed in claim 1, wherein the load information is transmitted to the corresponding mobile station using a synchronous control channel, asynchronous control channel, or dedicated channel.

6. The method as claimed in claim 1, wherein selecting a certain base transceiver system further comprises:

multiplying the load information provided for each base transceiver system by the forward data transmission rate determined for each base transceiver system;

comparing values calculated for the respective base transceiver system with one another; and selecting the base transceiver system having the largest value according to a result of comparison.

7. The method as claimed in claim 1, wherein the respective base transceiver systems belong to the active sets activated by the mobile station.

8. The method as claimed in claim 1, wherein the data transmission rate information of a forward link to be transmitted from the base transceiver system and the information on the base transceiver system selected by the mobile station are inserted into and transmitted through the DRC channel.

9. The method as claimed in claim 1, further comprising the base transceiver system receiving the DRC channel transmitted from the mobile station;

the base transceiver system checking the mobile station that completes the DRC channel transmission until ((present slot time)-1-(present slot time mod (DRC channel length)));

the base transceiver system determining the data transmission scheduling for one among the checked mobile stations according to the received DRC channel information; and performing the data transmission according to the data transmission rate requested by the corresponding mobile station according to the scheduling.

10. A method of selecting a base transceiver system in a communication system comprising:

receiving probability information and channel state information through a forward link;

estimating a forward data transmission rate corresponding to the channel state information;

selecting a corresponding base transceiver system in which the estimated forward data transmission rate and a value proportioned to the receiving probability in an active set become maximum; and requesting a forward data transmission to the selected base transceiver system through a data rate control (DRC) channel of a reverse link.

11. The method as claimed in claim 10, wherein the receiving probability is in reverse proportion to the number of mobile stations which the base transceiver system includes as its active set.

12. The method as claimed in claim 10, wherein the receiving probability is determined from a value obtained by dividing a length of a slot that received data by a length of a slot that requests the data to the specified base transceiver system.

13. The method as claimed in claim 10, wherein the receiving probability becomes different according to a kind of service and priority of the data received from the base transceiver system.

14. The method as claimed in claim 10, wherein the load information is transmitted to the corresponding mobile station using a synchronous control channel, asynchronous control channel, or dedicated channel.

15. The method as claimed in claim 10, wherein the receiving probability information is transmitted to corresponding mobile stations in case that the corresponding base transceiver system is included in an active set of a new mobile station.

16. The method as claimed in claim 10, wherein the receiving probability information is transmitted to corresponding mobile stations in case that the active set is changed over a threshold value.

17. The method as claimed in claim 10, wherein the receiving probability information is periodically transmitted to corresponding mobile stations according to a timer, or non-periodically transmitted according to a request of the corresponding mobile station.

18. The method as claimed in claim 10, wherein the mobile station is a mobile station that can perform data transmission/reception with at least two base transceiver systems.

19. The method as claimed in claim 10, further comprising the steps of: calculating a bit error rate or packet error rate from the channel state information; and determining the data transmission rate according to the calculated bit error rate or packet error rate.

20. A method of selecting a base transceiver system in a mobile station, comprising:

receiving load information corresponding to each of a plurality of base transceiver systems;

deciding a data transmission rate based on channel state information;

requesting forward data transmission through a data rate control (DRC)) channel of a reverse link;

selecting a base transceiver system from among said plurality of base transceiver systems using said received load information and said data transmission rate; and establishing data transmission with said selected base transceiver.

21. The method of claim 20, wherein said load information of each of at least one base transceiver system is a receiving probability of a signal.

22. The method of claim 21, wherein said receiving probability of each of at least one base transceiver system is in reverse proportion to the number of mobile stations the corresponding base transceiver system includes as its active set.

23. The method of claim 21, wherein said receiving probability is determined from a value obtained by dividing a length of a slot that received data by a length of a slot that requests the data to a specified base transceiver system.

24. The method of claim 20, wherein said deciding a data transmission rate is based on channel states of signals received at the mobile station from said at least one base transceiver system.

25. The method of claim 20, wherein said selecting further comprises:

multiplying said received load information from each base transceiver system by said data transmission rate decided for each base transceiver system;

comparing values of said multiplying results; and selecting a base transceiver system having the largest value according to said comparing result.

26. The method of claim 20, wherein said at least one base transceiver system belongs to an active set activated by the mobile station.

27. The method of claim 20, wherein said channel state information is obtained from a pilot signal sent from said at least one base transceiver system.

28. The method of claim 20, wherein said load information is receiving probability information.

* * * * *